Oct. 4, 1938.  T. MUNRO  2,132,040
TIRE COVER
Filed April 2, 1930  2 Sheets-Sheet 1
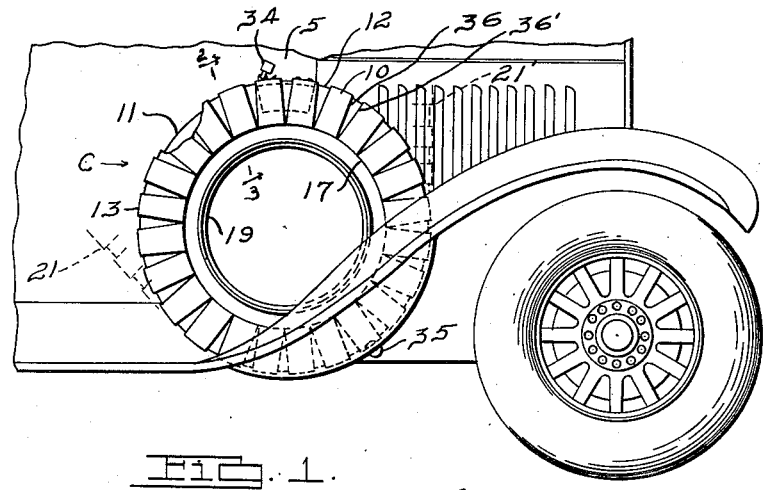
Fig. 1.
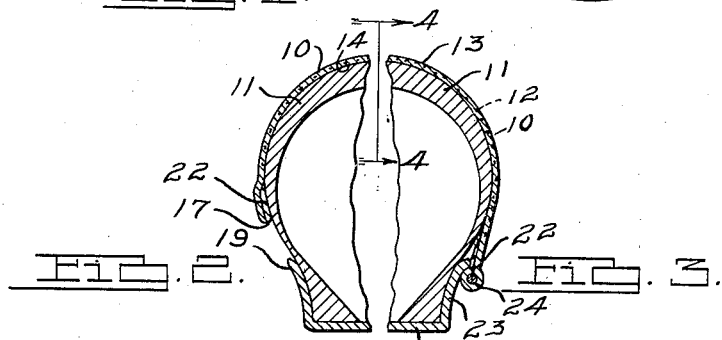
Fig. 2.  Fig. 3.
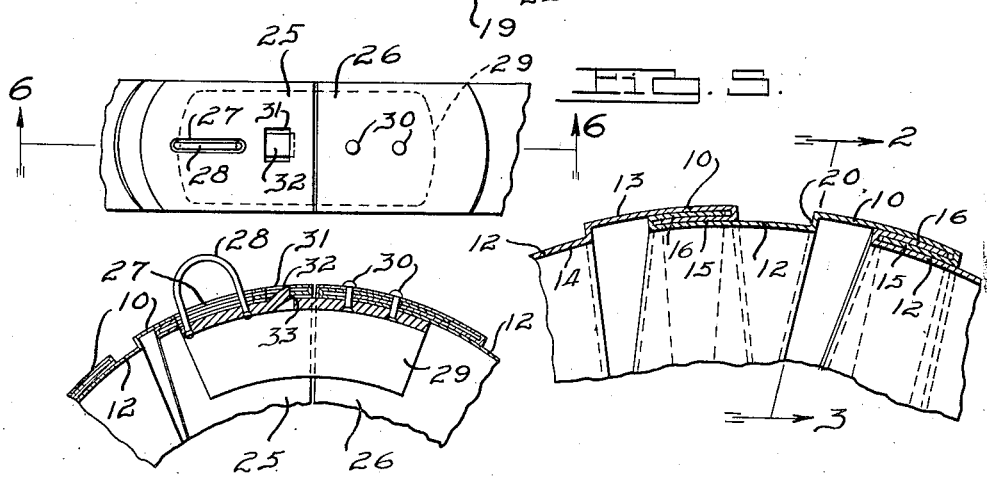
Fig. 5.
Fig. 6.  Fig. 4.
INVENTOR
Thomas Munro.
BY
Harness, Dickey, Pierce & Hann
ATTORNEYS.

Oct. 4, 1938.  T. MUNRO  2,132,040
TIRE COVER
Filed April 2, 1930  2 Sheets-Sheet 2
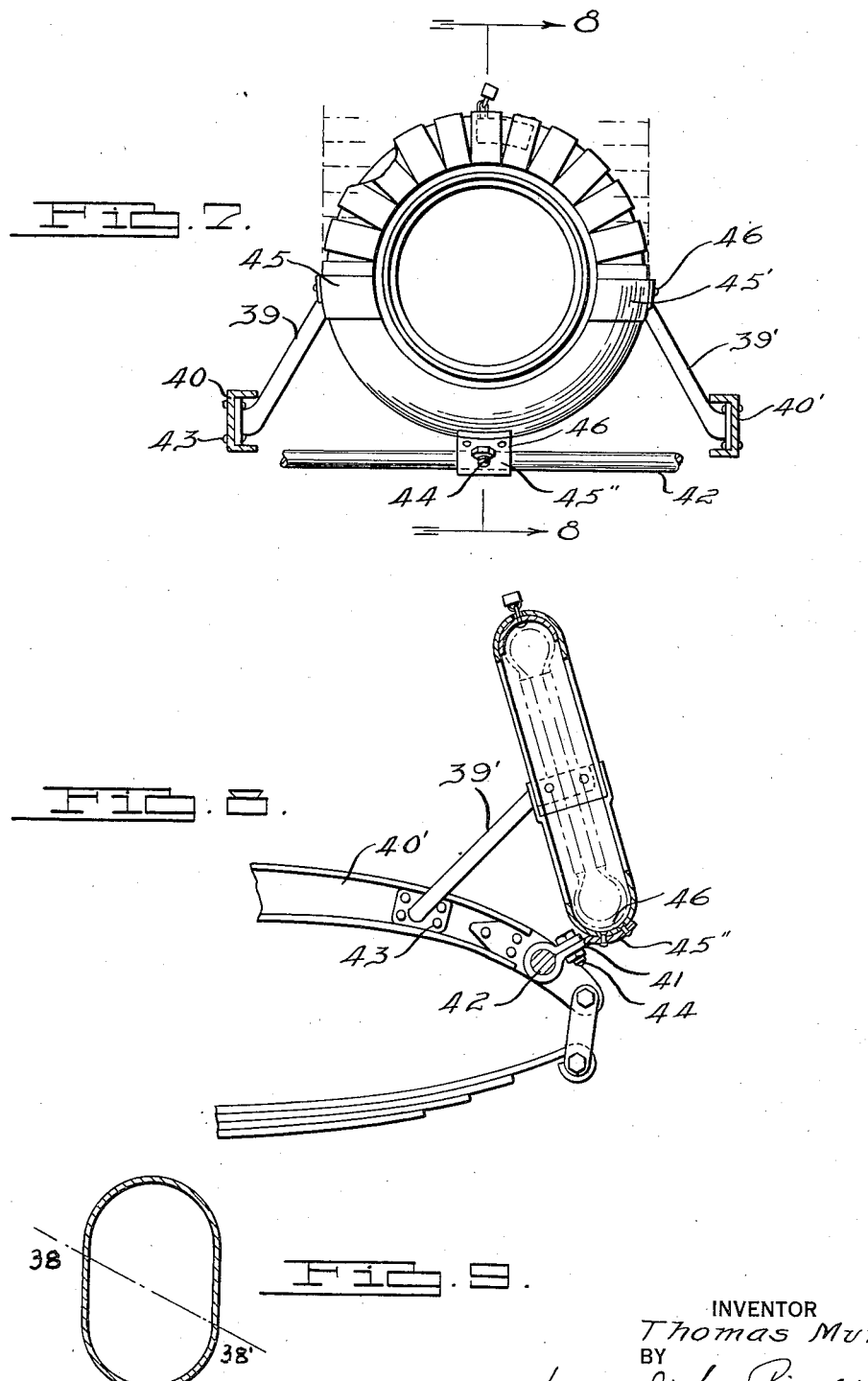
INVENTOR
Thomas Munro.
BY
ATTORNEYS.

Patented Oct. 4, 1938

2,132,040

UNITED STATES PATENT OFFICE 2,132,040

TIRE COVER

Thomas Munro, Philadelphia, Pa., assignor to Kittle Manufacturing Co., Los Angeles, Calif., a corporation of California Application April 2, 1930, Serial No. 441,102

2 Claims. (Cl. 150—54)

This invention relates to special and preferably all-metallic covers suitable for use in the protection of tires; and each cover may be said to consist of an interrupted major annulus comprising a series of straps or minor and interrupted annular elements. Outwardly exposed main portions of said annular elements may have a substantially uniform peripheral diameter where extending transversely over the tread portion of the protected tire; and they may include or be provided with integral or other inter-connecting means such as inwardly offset extensions,—by which each "strap" may be so inter-connected with adjacent straps as to provide a substantially continuous and complete covering, flexible in the plane of said major annulus.

Abutting ends provided by what may be termed a transverse cut or opening in said major annulus may be provided with cooperating parts of a suitable locking device; the ends of the minor annuli may so extend inward as collectively to provide substantially circular edges in any desired relationship to a rim upon which the tire may be mounted; and, in preferred embodiments of the invention, each of the so-called transverse straps may be integrally united with one adjacent extension. This construction is such as to provide, in each minor annular element, both an outwardly exposed portion and an inwardly exposed portion, the adjacent elements being slidably interconnected and preferably inter-locked by means such as oppositely extending flanges provided thereon.

Other objects of the present invention may be best appreciated from the following description of an illustrative embodiment thereof, taken in connection with the appended claims and the accompanying drawings.

Fig. 1 is a side elevational view showing an embodiment of the invention as applied to a tire mounted upon a rim and carried by a car,—parts of the latter being broken away.

Figs. 2 and 3 are enlarged radial half-sectional views, taken somewhat as suggested by the lines 2—3 of Figs. 1 and 4, and diagrammatically showing slightly different types of cases as associated with a tire and a rim. Features thereof may be used together.

Fig. 4 is a diagrammatic sectional detail view, taken somewhat as suggested by the line 4—4 of Fig. 3 and further enlarged.

Fig. 5 is a partial plan view, upon an intermediate scale, taken in the general manner suggested by an arrow 5 of Fig. 1 and showing one available type of terminal or lock fittings for the carrier.

Fig. 6 is a vertical sectional view taken substantially as indicated by the line 6—6 of Fig. 5.

Fig. 7 is an elevational view showing a tire cover of the new type as built into a tire carrier for use at the rear of a car.

Fig. 8 is a vertical sectional view taken substantially as suggested by the line 8—8 of Fig. 7.

Fig. 9 is a diagram pertinent to steps in a preferred method whereby two covers are obtained from one section of flexible tubing.

Referring first to general features shown in Figs. 1-4 inclusive, a major annulus constituting a tire cover C may include a series of protective metallic strap-like elements 10, extending transversely over the tread of a tire, each strap having the character of an interrupted minor annulus. Said straps may be formed of sheet metal and of substantially uniform diameter as measured along the periphery of the major annulus. To complete the protection of the enclosed tire 11, each strap may be associated or provided with an extension 12, which, unless formed of a flexible material, may be inwardly offset in relation thereto in such manner as to slidably interfit within or beneath an adjacent strap; and, in order to provide not only for flexibility of the major annulus in the plane thereof but for an overlapping effect, convex outwardly exposed surfaces 13 being provided by the series of straps 10 and concave inwardly exposed surfaces 14 being provided by the extensions 12, separation of adjacent elements respectively including the mentioned portions may be obviated by means such as oppositely disposed and interlocking flanges 15 and 16 provided respectively upon said straps and said extensions.

As will be apparent from an inspection of Figs. 1 and 4, assuming the straps 10 to have the mentioned uniform diameter, and substantially to abut at the inner ends thereof, they may provide a substantially continuous circular edge 17, uniformly spaced from any rim 19 upon which the tire 11 may be mounted. The exposed portions of the extensions 12 will present triangular outlines, as seen in elevation, when the tire cover is secured upon a tire; but, as may be best appreciated from the inspection of Fig. 4, not only the straps 10 and the extensions 12 (these being shown as interconnected only by a radially extending web 20), but also the flanges 15 and 16 are preferably curved in two directions at right angles to one another in such manner as to permit the cover, or any desired portion thereof, to be backwardly bent or straightened out, somewhat as suggested by dotted lines 21, 21', to a degree permitting the insertion or removal of a tire.

The inwardly extending ends provided at 17 by the interruption of the straps 10, may be finished in any suitable manner, as by inwardly folding the same upon themselves substantially as suggested at 22, Fig. 2, to avoid exposed raw edges; and the inturned portion may be permitted to engage the enclosed tire 11, as suggested in the figure last mentioned, or, as suggested in Fig. 3, an inturned portion 22 may extend opposite or engage an adjacent portion 23 of rim 19. In either case, the finished edge so provided may be reinforced in any suitable way, as by the insertion of a wire 24; and the resiliency of strips 10 may cause the edges 17 to "hug" the tire 11 and/or the rim 19.

As best shown in Figs. 5 and 6, abutting end portions 25 and 26 of an annulus constituting a tire cover may be provided with any suitable cooperating elements for the inter-locking thereof, securely to retain a tire. For the purpose here referred to, the end 25 is shown as provided with a longitudinally extending slot 27, of such size, shape and position as outwardly to receive a hasp 28. This may be secured to the end 26 by means such as a suitably curved interior fitting 29, shown as retained by rivets 30. In order that the mentioned parts shall "snap" into an inter-locking engagement when merely brought into abutting relationship, the end 25 being shown as provided with an additional and substantially rectangular opening 31, the fitting 29 may be provided with an outwardly extending and inclined latch element 32, adapted to enter said opening and to engage a substantially radial surface 33 provided therein or thereby.

The general manner of use of the described cover having been indicated in connection with the foregoing description thereof, it will be understood that means such as a padlock 34, applied to the hasp 28, will suffice to secure the cover upon a tire; and that any one of a great variety of devices, not shown, may be employed to retain the entire assembly,—as by engagement with the rim 19. Alternatively the described tire carrier may be permanently or removably secured directly to a car, as by the use of the same or an additional hasp device or by rivets extending through a suitable concavity provided therefor at the end of a running board or elsewhere. Removal of the mentioned padlock and an inward springing of the latch element 32 will be seen to permit the carrier to be opened to any appropriate degree, somewhat as indicated by the dotted lines 21, 21', for the insertion or removal of a tire; and it may be mentioned that flexible, all-metal tire carriers of the described type may, if desired, be formed from a stock obtained by cutting and shaping units cut from a special and comparatively large flexible tubing,—any slight resultant spiral inclination of the plural ply "straps" 10 being either tolerated or obviated and being too slight for convenient pictorial representation.

It will be noted that Figs. 2 and 3 may be read as one figure,—a more complete protection being optionally provided for the outer side of the spare tire than for the inner side thereof,—next the car; and, as may be best appreciated by a glance at Fig. 9, the construction here referred to may advantageously be effected by steps which include a slight flattening of a large flexible tube, to impart thereto a somewhat elliptical cross-sectional outline and/or a longitudinal slitting of a flattened or other tube through opposite walls thereof, as at 38, 38',—the plane of the slitting being preferably so inclined with reference to the plane of flattening, as to produce what may be termed a lop-sided cross section in each of the two resultant "blanks" for use as tire covers.

In Figs. 7 and 8, an organization which includes a tire cover permanently built into or combined with a tire carrier is shown as including upwardly convergent arms 39, 39' carried by the rear "horns" 40, 40' of a chassis, and an intermediate arm 41,—the latter being disposed centrally of a transverse member such as a rod or tube 42 extending between said "horns". The inner ends of these arms may be permanently or removably secured, as by rivets or bolts at 43, 44; and plate-like and/or curved outer portions 45, 45', 45", or equivalent elements, secured (as by rivets at 46) to the exterior of a major annulus of the disclosed character, may serve to hold the latter upon said arms and in spaced relationship to the rear of a car. This carrier may also open at the top in substantially the manner already described; but it is not intended ordinarily to permit separation of this tire cover, as such, from the arms and associated parts which cooperate therewith to provide also a tire carrier.

It may also be suggested that in either of the constructions disclosed, half or less of the annulus may be made of one or more pieces of sheet metal and of rigid formation, with the remainder of the annulus, of the flexible character disclosed, suitably secured to the rigid part or parts,—thus effecting substantially the same result in operation.

It will be evident that a slidable interconnection of straps 10 is simpler, more durable and more reliable than any pivoted interconnection thereof at or near their inner ends. It will be seen that, in case the straps 10 abut at the inner ends thereof even when the tire cover is closed, assuming the inner edges 17 to be reinforced, as suggested in Fig. 3, by means rendering the same substantially inextensible, the tire carrier is not "floppy" and can be backwardly flexed to but a limited extent,—until opposite edges 36, 36' of adjacent straps abut throughout their length; and an anti-rattling effect may be favored not only by giving to the mentioned flanges 15 and 16 the indicated double curvatures, adapting them snugly to interfit between cooperating surfaces, but also by giving said flanges such dimensions as to place the periphery of the tire carrier under a slight tension during the completion of a closing movement, in the described manner. It should, however, also be understood not only that various features of the present invention might be independently employed but also that numerous modifications, additional to any suggested herein, might easily be devised by skilled workers if informed of the foregoing,—all without departure from the scope of the present invention, as the latter is indicated by the following claims.

I claim:

1. In a tire cover, a series of slidably interfitting metallic protective elements, each of said elements comprising a narrow arch adapted to cover the sides and tread of a tire and having reversely bent tongues adjacent the meeting edges thereof and adapted to engage and interlock with like tongues of adjacent elements for collectively forming an annulus, said elements and said annulus being so formed and so interrupted as to permit of a flexing of said series in the plane of said annulus, for the insertion of a tire therein.

2. A tire cover consisting of a series of segments, each comprising a narrow arch adapted to cover the sides and tread of a tire and adapted to be joined together around a tire to form a split annulus, each segment being provided with an inversely bent tongue around one edge thereof and an offset portion around the opposite edge thereof, said offset portion terminating in an inversely bent tongue for interlocking engagement with the first mentioned reversely bent tongue of an adjacent segment, said engagement providing relative circumferential movement between the segments to allow the split annulus to be enlarged in diameter for the reception of a tire, and means for securing the ends of the annulus together when closed upon a tire.

THOMAS MUNRO.